United States Patent [19]

Hamisch, Sr.

[11] 3,965,772

[45] June 29, 1976

[54] SELECTIVE DRIVE CONNECTION FOR A CUTTING APPARATUS

[75] Inventor: Paul H. Hamisch, Sr., Dayton, Ohio

[73] Assignee: Monarch Marking Systems, Inc., Dayton, Ohio

[22] Filed: Jan. 10, 1975

[21] Appl. No.: 540,042

Related U.S. Application Data

[62] Division of Ser. No. 448,094, March 4, 1974, Pat. No. 3,867,861.

[52] U.S. Cl. .................................... 74/586; 74/522

[51] Int. Cl.[2] ............................................ F16C 7/06

[58] Field of Search ............. 74/586, 599, 600, 571, 74/559, 522, 40

[56] References Cited

UNITED STATES PATENTS

| | | | |
|---|---|---|---|
| 2,308,212 | 1/1943 | Scott-Iverson et al. | 74/600 X |
| 2,836,081 | 5/1958 | Dehn | 74/522 |
| 3,557,639 | 1/1971 | Homstead | 74/600 X |

*Primary Examiner*—Samuel Scott
*Assistant Examiner*—F. D. Shoemaker
*Attorney, Agent, or Firm*—Joseph J. Grass

[57] ABSTRACT

There is disclosed apparatus for printing and intermittently feeding a web of tags or labels and for cutting the printed tags or labels from the web. The cutting apparatus includes a cutting mechanism and a selective drive connection by which the cutting mechanism can be rendered selectively effective or ineffective.

4 Claims, 8 Drawing Figures

SELECTIVE DRIVE CONNECTION FOR A CUTTING APPARATUS

CROSS-REFERENCE TO RELATED APPLICATION

This is a division of application Ser. No. 448,094, filed Mar. 4, 1974, now U.S. Pat. No. 3,867,861.

BACKGROUND OF THE INVENTION

1. Field of the Invention

This invention relates to the field of printing and cutting apparatus.

2. Brief Description of the Prior Art

Prior art U.S. Pat. Nos. are as follows: 924,767; 1,317,373; 2,515,354; 2,842,401; and 3,732,770. Other prior art structure is disclosed hereafter in the specification.

SUMMARY OF THE INVENTION

The invention resides in a cutting apparatus having an improved drive arrangement. The apparatus has a drive pin that travels continuously in a circle. The drive pin is effective to drive a connecting rod which in turn drives a cutting mechanism. The connecting rod carries a selective drive connection for rendering ineffective the drive between the drive pin and the the connecting rod. The selective drive connection is settable in one position in which the drive pin can contact its drive face and drive the connecting rod to drive the cutting mechanism and in another position in which the drive pin is ineffective to contact the drive face and thus the cutting mechanism is not operated. The selective drive connection comprises a pivotal settable member carried by the connecting rod. When the settable member is in the effective position it fills a substantial portion of a slot in the connecting rod, but in the ineffective position the settable member is out of the slot and the drive pin moves freely in the slot without driving the connecting rod. Suitable means such as a detent is used to releasably hold the settable member in either its effective or its ineffective position.

The apparatus can print on either tag webs or label webs. When printing tags it is usual practice to want to cut off tags from the web using the cutting apparatus. When printing pressure-sensitive labels it is usual practice not to use any such cutting apparatus. The label webs can be rewound or the labels can be manually stripped from the web. The invention permits the easy change over from use of the apparatus for printing tags to printing pressure-sensitive labels, and vice versa without removing or reinstalling the cutting apparatus, which would result in loss of adjustment, loss of time, and inconvenience.

DESCRIPTION OF THE PREFERRED EMBODIMENT

Figure 1:
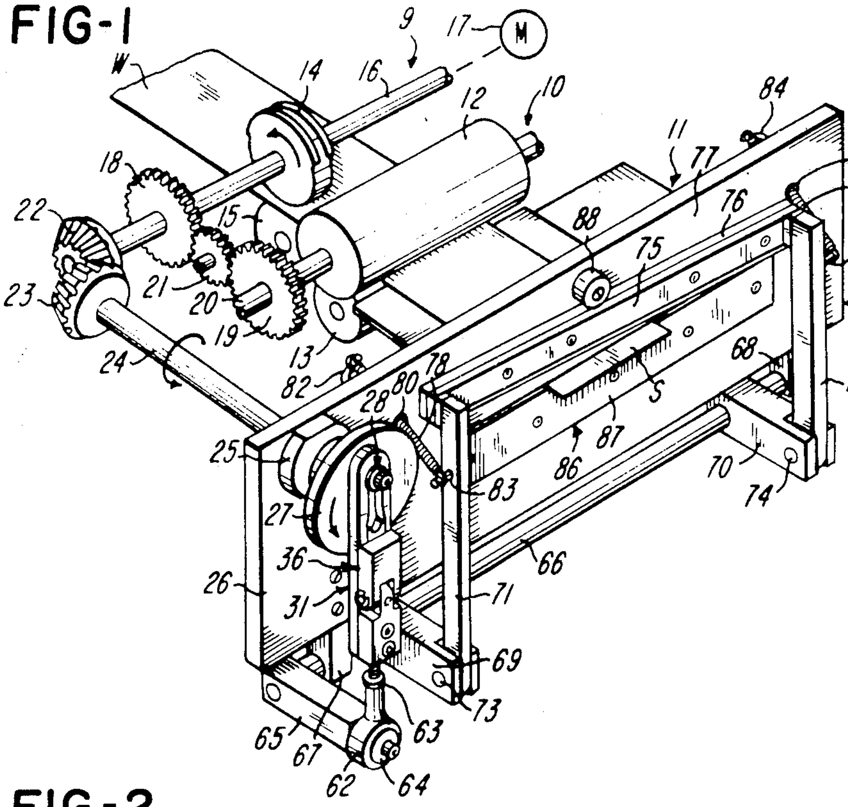
FIG. 1 is a perspective view of apparatus in accordance with the invention.

Referring to FIG. 1, apparatus 9 has a printing station generally indicated at 10 and a cutting station generally indicated at 11 having a cutting mechanism 11'. The printing station has a printing roll 12 and a platen roll 13 between which a web W, such as a web of tags or labels passes to the cutting station 11. The web W is advanced intermittently by a known type of arrangement of a segmental feed roll 14 and a cooperating back-up roll 15. The feed roll 14 is securely mounted on a drive shaft 16 driven by a continuously rotating electric motor 17. A spur gear 18 secured to the drive shaft 16 drives a gear 19 on printing drum shaft 20 through an idler gear 21. A bevel gear 22 secured to the drive shaft 16 drives a bevel gear 23 secured to a drive shaft 24. The drive shaft 24 is rotatably mounted in a bearing 25 mounted by frame member 26. A drive disc 27 securely mounted on the shaft 24 carries a drive pin 28. Rotation of the drive disc 27 causes the drive pin 28 to rotate in a circle about the axis of rotation of the shaft 24. The pin 28 has a cylindrical portion 29 which is received in elongated slot 30 in connecting rod 31. The pin 28 has an elongated head 32 and a threaded shank 33. Washers 34 and 35 are received by the cylindrical portion 29 on opposite sides of the connecting rod 31. The shank 33 is threadably received by the disc 27.

Figure 6:
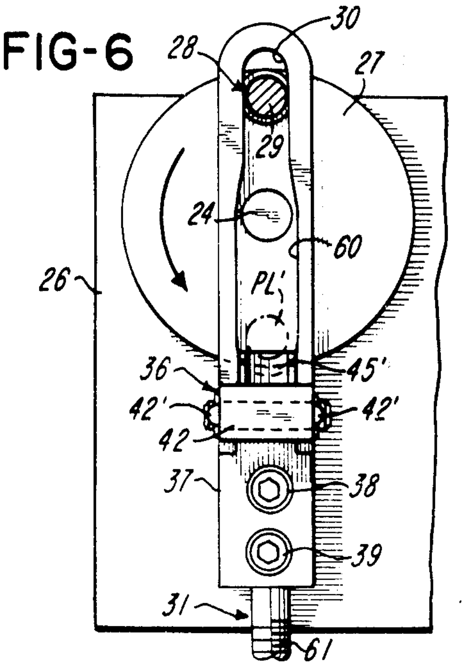
FIG. 6 is a view similar to FIG. 4, but showing the settable member in its ineffective position.
Figure 7:
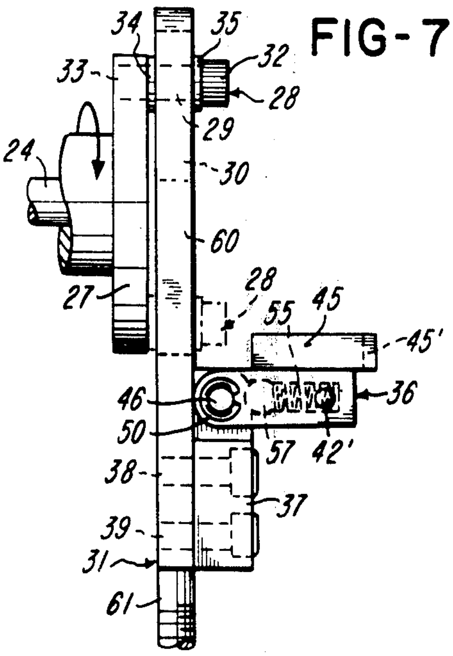
FIG. 7 is a left side elevational view of FIG. 6.

The connecting rod 31 carries a selective drive connection generally indicated at 36. A mounting block 37 is secured to the connecting rod 31 by screws 38 and 39 received in the threaded holes 40 and 41. The selective drive connection 36 includes a pivotal member 42 having arms 43 and 44 and an integral block 45 having a drive face 45'. A pivot pin 46 passes through a hole 47 in the arm 43, a hole 48 in the block 37, and a hole 49 in the arm 44. Retaining clips 50 and 51 cooperate with respective grooves 52 and 53 in the pin 46 to hold the pin 46 in position. The selective drive connection 36 is pivotal from the position shown in solid lines in FIG. 3 to the position shown by phantom lines PL in FIG. 3. A ball detent generally indicated at 54 comprises a compression spring 55 received in a recess 56 in the member 42 and a ball 57. The block 37 has a pair of recesses 58 and 59 with which the ball 57 can alternately cooperate. The ball 57 cooperates with the recess 58 in the block 37 to releasably hold the selective drive connection 36 in the solid line positions of FIGS. 3, 4 and 5. In this position the block 45 substantially fills the lower enlarged portion of the slot 60. The ball 57 cooperates with the recess 59 to releasably hold the selective drive connection 36 in the position shown by phantom lines PL in FIG. 3 and in solid lines in FIGS. 6 and 7. Knobs 42' can be gripped by the user's fingers to help shift the selective drive connection 36.

Figure 3:
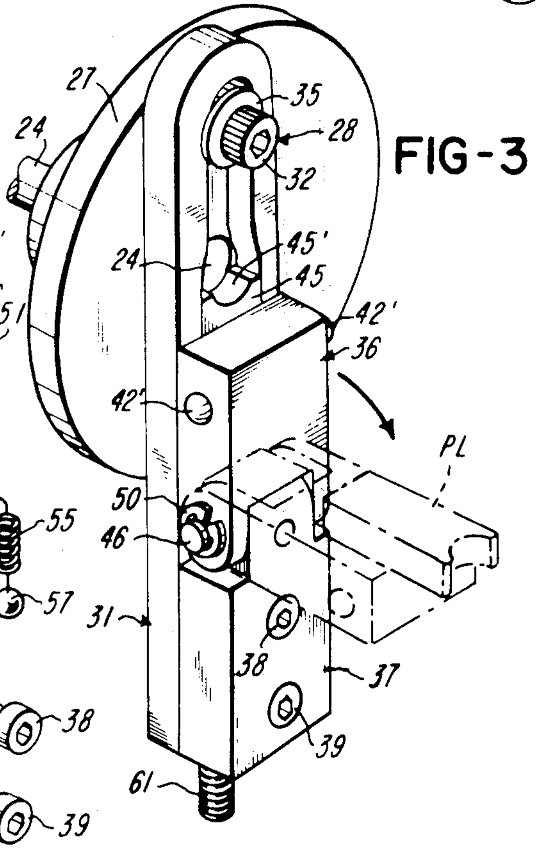
FIG. 3 is a fragmentary assembled view of apparatus shown in FIGS. 1 and 2.
Figure 4:
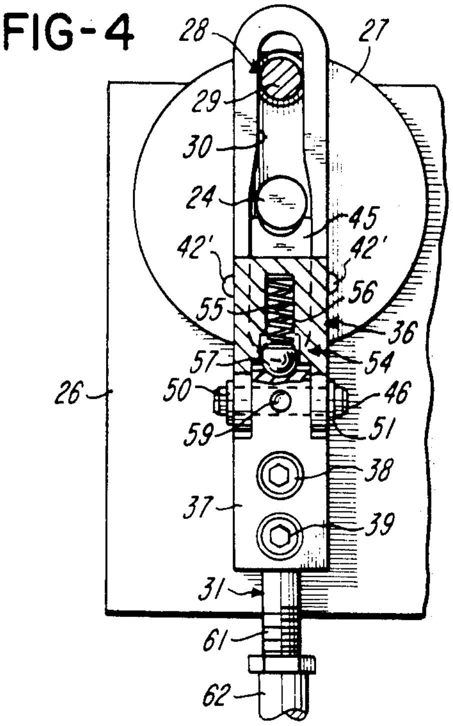
FIG. 4 is an elevational, partly sectional view, of the portion of the apparatus shown in FIGS. 1, 2 and 3, with the drive pin and associated structure shown in one rotational position.
Figure 5:
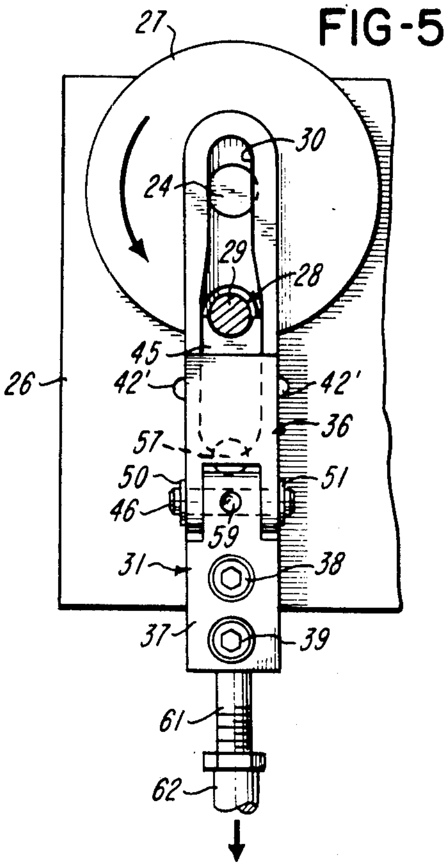
FIG. 5 is a view similar to FIG. 4, but showing the drive pin in a different rotational position.

It is apparent that when the selective drive connection 36 is in the position shown in FIGS. 1, 3, 4 and 5, the pin 28 will contact the drive face 45' and will drive the connecting rod 31 from the position shown in FIG. 4 to the position shown in FIG. 5. In the event the selective drive connection 36 is in the position shown in the solid lines in FIGS. 6 and 7, then when the drive pin 28 moves to the position shown by phantom lines PL′, the drive pin 28 cannot contact the drive face 45′ and thus the connecting rod 31 is not driven downwardly as viewed in FIGS. 6 and 7.

The connecting rod 31 includes a slotted section 60, a threaded shank 61, a socket 62, a lock nut 63 and a ball 64. The ball 64 is secured to the end of a lever arm 65. The lever arm 65 is secured to a shaft 66 pivotally mounted in bearings 67 and 68 mounted to the frame member 26. A pair of arms 69 and 70 are secured to the shaft 66. A pair of rods 71 and 72 are pivotally connected to the respective arms 69 and 70 by pivot pins 74 and 74. A supporting bar 75 is secured to the upper ends of arms 71 and 72 (FIG. 1). A movable knife blade 76 is suitably secured to the supporting bar 75. The flat side of the knife blade 76 is urged against the rear face 77 of the frame member 26 by tension springs 78 and 79 which pass through oversize holes 80 and 81 in the plate 26. The springs 78 and 79 are connected to respective studs 82 and 83, 84 and 85. A stationary knife blade 86 has a rear face 87 which is flush with the rear face 77 of the plate 26. As shown in FIG. 1, the knife blade 76 is inclined relative to the knife blade 86 to effect shearing of a sheet S, tags or labels, from the web W as the knife blade 76 is moved downwardly as viewed in FIG. 1. The springs 78 and 79 function also as return springs which normally urge the knife 76, the supporting bar 75, and rods 71 and 72 upwardly, and urge arms 69 and 70, shaft 66 and lever arm 65 counterclockwise as viewed in FIG. 1, and this causes the connecting rods 31 to be urged to the upward position as shown in FIGS. 3, 4, 6 and 7 such that the flat upper end of the knife blade 76 bears against a stop 88.

The operation of the apparatus is described below, with the selective drive connection 36 being in the position shown in FIGS. 1, 4 and 5 and the solid line position of FIG. 3. The electric motor 17 continuously drives the drive pin 28 in a circular path. There is some lost motion as the drive pin 28 moves from the position shown in FIGS. 1, 3 and 4 to the position where the drive pin 28 starts contacting and driving the drive face 45′. Upon continued rotation of the drive disc 27, the drive pin 28 will drive the connecting rod 31 downwardly as viewed in FIGS. 1, 3 and 4, thereby causing the lever arm 65, shaft 66 and arms 69 and 70 to pivot clockwise as viewed in FIG. 1. This causes rods 71 and 72, supporting bar 75 and knife 76 to move downwardly into shearing cooperation with the stationary knife 86, and thereby severing the sheet S from the web. When the drive pin 28 has rotated past the low point. as viewed in FIG. 5, the springs 78 and 79 cause the bar 76, the knife 76, rods 71 and 72, and the connecting rod 31 to move upwardly, while the arms 69 and 70 and the lever arm 65 pivot counterclockwise. The timing is such that when there is a pause in feeding, the knife blade 76 will shear a sheet S from the web W.

It is sometimes desired to print the web without cutting the web into sheets. In this event, the selective drive connection 36 is manually moved to the position shown by phantom lines PL in FIG. 3 and the solid lines in FIGS. 6 and 7; in this position of the selective drive connection 36, rotation of the drive disc 27 cannot exert any downward driving force on the connecting rod 31 and thus the knife 76 is not operated.

Figure 8:
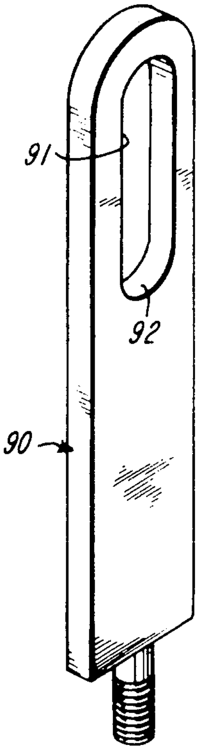
FIG-8 (PRIOR ART)
FIG. 8 is a perspective view of a prior art connecting rod.
Figure 2:
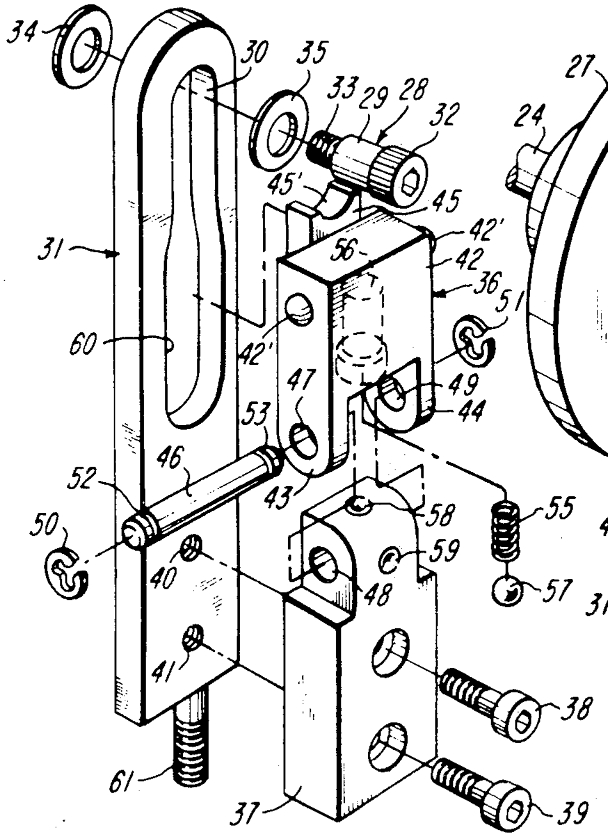
FIG. 2 is an exploded perspective view of a fragmentary portion of apparatus shown in FIG. 1.

FIG. 8 shows the prior art connecting rod 90. Its elongated slot 91 has a drive face 92. The relative position of the drive face 45′ is the same as that of the drive face 92. Thus when the selective drive connection 36 is in the position shown in FIG. 1 for example the apparatus 10 functions the same as if the connecting rod 90 were used. The connecting rod 90 did not, however, allow the cutting mechanism 11′ to be selectively rendered effective or ineffective, as with the present invention. Except for the connecting rod 31 to which the selective drive connection 36 is mounted by block 37, the remainder of the apparatus 9 with connecting rod 90 is known in the art.

Other embodiments and modifications of this invention will suggest themselves to those skilled in the art, and all such of these as come within the spirit of this invention are included within its scope as best defined by the appended claims.

I claim:

1. Apparatus, comprising: a rod having an elongated slot, a pin driven in a path and received in the slot, a settable member having a drive face, means mounting the settable member to the rod for selective movement between one position in which the drive face of the settable member is in the slot and another position in which the drive face is out of the slot, the pin being effective in the one position to drive the rod upon contact with the drive face and the pin being ineffective to drive the rod when the settable member is in the other position.

2. Apparatus as defined in claim 1, including means for releasably holding the settable member in either of the positions.

3. Apparatus as defined in claim 1, including means for driving the pin in a circular path.

4. Apparatus as defined in claim 1, including means for driving the pin in a circular path, and means for releasably holding the settable member in either of the positions.

* * * * *